May 13, 1924.
O. C. LARSON
REMOVABLE VALVE SEAT
Filed Feb. 7, 1923
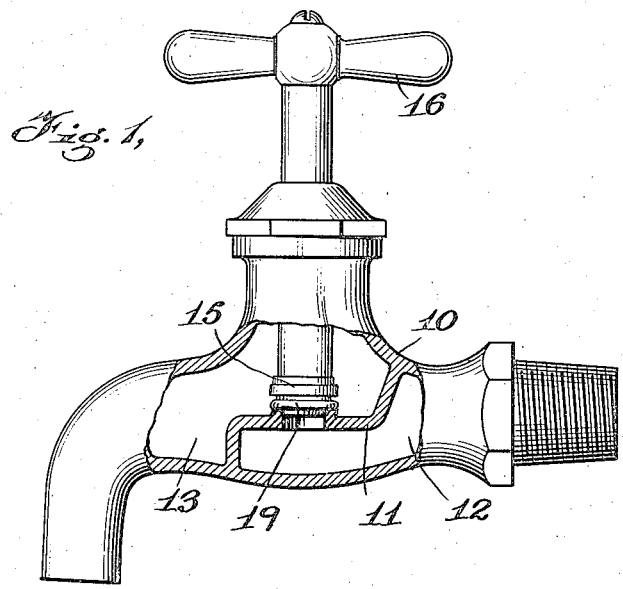
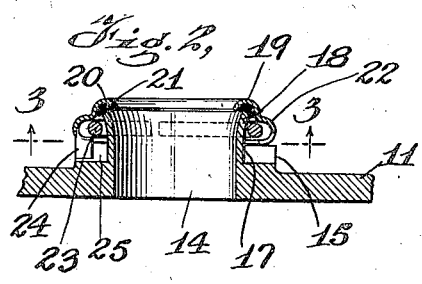
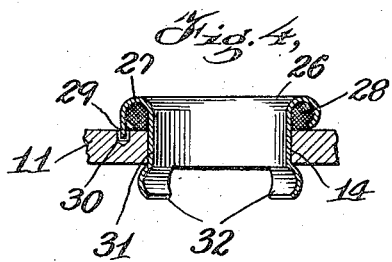
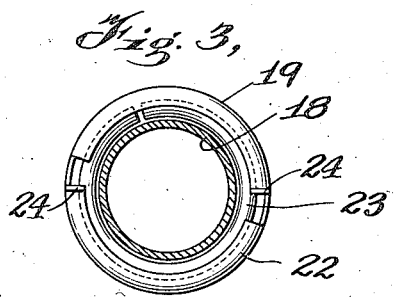
Inventor
Otto C. Larson
By his Attorneys
Edgar Tate Patented May 13, 1924.

1,493,784

UNITED STATES PATENT OFFICE.

OTTO C. LARSON, OF BROOKLYN, NEW YORK.

REMOVABLE VALVE SEAT.

Application filed February 7, 1923. Serial No. 617,434.

*To all whom it may concern:*

Be it known that I, OTTO C. LARSON, a citizen of the United States, and residing at Brooklyn, in the county of Kings and State of New York, have invented certain new and useful Improvements in Removable Valve Seats, of which the following is a specification, such as will enable those skilled in the art to which it appertains to make and use the same.

This invention relates to valves of various kinds and classes or to devices employing valves and more particularly to what are known as removable valve seats; and the object of the invention is to provide a removable valve seat of the class described, which is simple in construction and which may be readily attached to and detached from a valve, whereby the replacement of valve seats may be simply and economically affected, and with this and other objects in view, the invention consists in a valve seat of the class described, which is constructed as hereinafter set out.

The invention is fully disclosed in the following specification, of which the accompanying drawing forms a part, in which the separate parts of my improvement are designated by suitable reference characters in each of the views, and in which:—

Fig. 1 is a side view of a faucet with part of the construction broken away and in section and showing one of my improved valve seats mounted in connection therewith.

Fig. 2 is a sectional view on an enlarged scale of a part of the construction shown in Fig. 1.

Fig. 3 is a section on the line 3—3 of Fig. 2; and

Fig. 4 is a view similar to Fig. 2 and showing a modification.

In Fig. 1 of the drawing, I have shown for the purpose of illustrating one use of my invention, a faucet 10 the body of which is provided with the usual partition wall 11 to divide the intake side 12 of the faucet from the exhaust side 13 thereof and the wall 11 is provided with the usual aperture 14, controlled by a valve 15, the stem of which extends through the top of the faucet and is provided with a usual handle member 16.

In the construction shown in Figs. 1 to 3 inclusive the partition wall 11 around the aperture 14 therein is provided with an upstanding projection 17, which flares outwardly to a slight extent as shown at 18, and mounted upon the projection 17 is a removable valve seat 19 which in the construction shown in said figures is composed of sheet metal fashioned to form a seat proper 20, within which is a packing ring or gasket 21 and below the seat proper 20 is formed an annular and beaded projection 22, which retains a spring ring 23, said ring being adapted to operate in connection with the flared portion 18 of the projection 17 to retain the valve seat against accidental displacement thereon. The beaded portion 22 is also provided with downwardly directed members 24, which are adapted to cooperate with grooves 25 formed in the partition wall 11 about the periphery of the projection 17 thereof, and this construction serves to key the valve seat 18 against rotation on the projection 17. With the construction shown in Figs. 1 to 3 inclusive, it will be understood that the valve seat 20 may be sprung onto or off from the projection 17, and it will be apparent that a suitable tool will be used for removing this valve seat, said tool engaging the slightly inwardly projecting portion of the seat 20 proper thereof. With a valve seat of this class, when a seat has become worn and rendered useless, a new seat may be quickly and easily substituted and at a nominal cost, thus materially increasing the life of valves, faucets and the like of various kinds and classes and avoiding the necessity of regrinding or discarding such valves and faucets.

In Fig. 4 of the drawing, I have shown a slight modification in which the projecting portion 17 of the partition wall 11 is omitted and a valve seat 26 is passed through the aperture 14 in the wall 11, and in this construction the valve seat 26 is provided at the top thereof with a beaded portion 27 retaining a packing ring 28 therein which operates upon the top of the wall 11 around the aperture 14 and the beaded portion 27 has a downwardly projecting member or members 29 which operate in connection with recesses 30 to key the valve seat against rotation and the lower end portion of the tubular body 31 of the valve seat which passes through the aperture 14, has a plurality of spring members 32 which operate to retain the valve seat against displacement in the aperture 14 of the wall 11.

With the construction shown in Fig. 4 it will be apparent that a suitable tool may be used for inserting and removing the valve seat at will, and this seat will operate to produce the same results and effects as the seat shown in Figs. 1 to 3 inclusive and increase the life of a valve of any kind or class.

With all of the construction shown, it will be apparent that the removable valve seat may be quickly and easily attached to and detached from the body structure of the valve and when in operative position, said seat comprised a suitable packing ring to form a liquid, gas or air-tight connection between the seat and the body structure of the valve in connection with which the seat is mounted and especially when the valve 15, which operates in connection with the seat, is in a closed position when operating in connection with the valve seat shown in Figs. 1 to 4 inclusive, wherein the compression of the valve 15 will correspondingly compress the packing material employed.

It will be understood that while I have shown my invention as applied to a faucet, and have also shown certain specific details in the seat structure, that my invention is not necessarily limited in these respects and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A valve seat of the class described comprising an annular body fashioned from sheet metal, means on said body for retaining packing material therein, means for frictionally retaining said body against accidental displacement from a suitable support, and means integral with said body cooperating with said support for keying said body against rotation.

2. A valve seat of the class described comprising an annular body one end of which is fashioned to form a beaded portion, a packing ring mounted on said body within said beaded portion, and means at the other end of the body for detachably mounting and frictionally retaining the same in connection with a suitable support.

3. A valve seat of the class described comprising an annular body one end of which is fashioned to form a beaded portion, a packing ring mounted on said body within said beaded portion, and means at the other end of the body for detachably mounting and frictionally retaining the same in connection with a suitable support, said means comprising spring members fashioned from the material of said body.

4. A valve seat of the class described comprising an annular body fashioned to form a projecting portion, a packing ring mounted in the projecting portion of said body and retained in position thereby, and means on said body for detachably and frictionally retaining the same in connection with a suitable support.

5. A valve seat of the class described comprising an annular body fashioned to form a projecting portion, a packing ring mounted in the projecting portion of said body and retained in position thereby, and means on said body for detachably and frictionally retaining the same in connection with a suitable support, said means comprising a resilient element.

6. A valve seat of the class described comprising an annular body fashioned to form a projecting portion, a packing ring mounted in the projecting portion of said body and retained in position thereby, means on said body for detachably and frictionally retaining the same in connection with a suitable support, said means comprising a resilient element, and means on said body and cooperating with the support for keying said body against rotation.

In testimony that I claim the foregoing as my invention I have signed my name this 2nd day of February 1923.

OTTO C. LARSON.